Aug. 30, 1966 R. B. LEWIS 3,269,578
DISPLAY DEVICE
Filed March 25, 1964 2 Sheets-Sheet 1
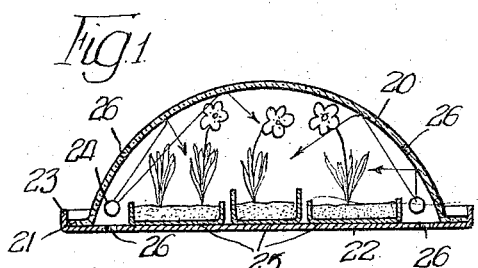
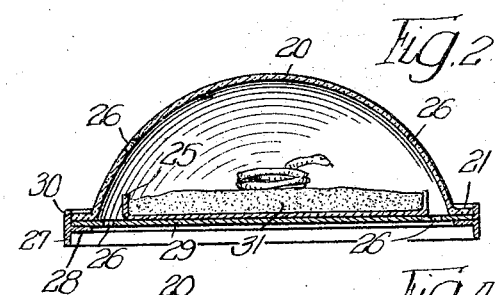
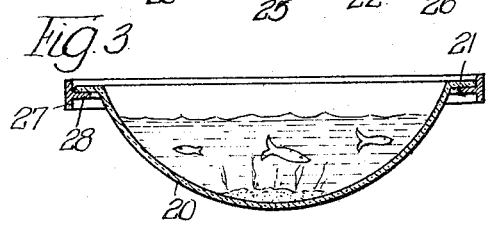
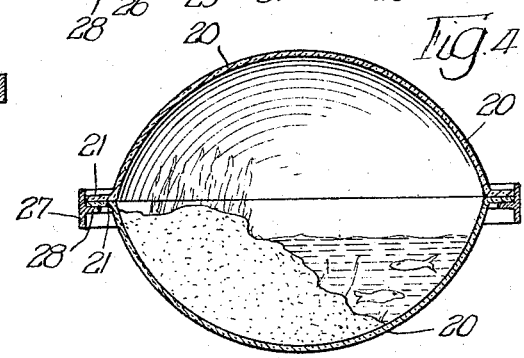
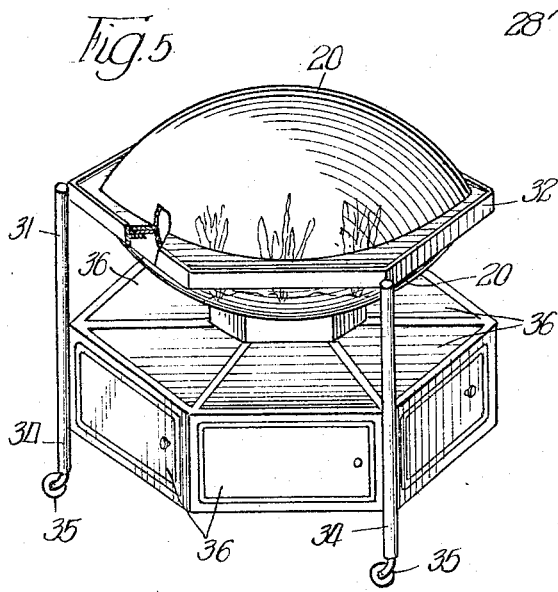
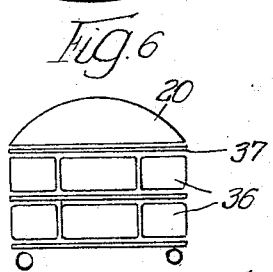
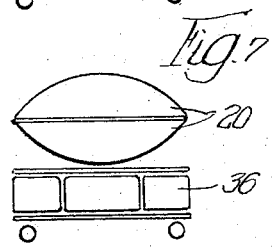
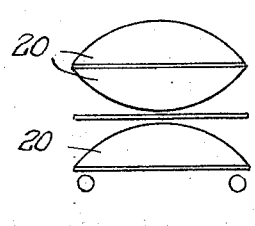
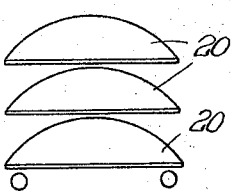
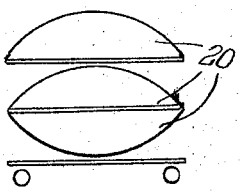
INVENTOR.
Robert B. Lewis,
BY
Hume Groen, Clement & Hume
Attys Aug. 30, 1966 R. B. LEWIS 3,269,578
DISPLAY DEVICE
Filed March 25, 1964 2 Sheets-Sheet 2

INVENTOR.
Robert B. Lewis,
BY
Hume, Groen, Clement & Hume
Attys

United States Patent Office 3,269,578
Patented August 30, 1966

1

3,269,578
DISPLAY DEVICE
Robert B. Lewis, P.O. Box 262, Aspen, Colo.
Filed Mar. 25, 1964, Ser. No. 354,567
7 Claims. (Cl. 220—4)

This invention relates to a new and improved device adapted to serve as an enclosure or receptacle. It is especially adapted for use in accommodating an environment for living biological specimens and associated objects to be displayed for ready observation.

It is a primary object of this invention to provide means for accommodating an atmosphere or environment for display of living biological specimens, such as animals, organisms, plants, and associated objects, and includes one or more inexpensive, transparent members which may be utilized in one particular as an enclosing dome and in another particular in an inverted position as a receptacle. This and other objects of the invention may be more readily understood as the following description proceeds.

In the accompanying drawings:

FIGURE 1 represents an elevational view, partly in cross-section, of a device constructed according to this invention and utilized to provide an environment for plant life;

FIGURE 2 is an elevational view illustrating the use of the device of this invention to provide an environment for terrestrial forms of animal life;

FIGURE 3 is an elevational view, partly in cross section, showing the device of this invention utilized for maintaining and displaying aquatic life;

FIGURE 4 illustrates the use of two transparent members of this invention, one serving as a receptacle for accommodating both aquatic and amphibious life and vegetable life, and the other serving as an enclosing dome for maintaining the desired atmosphere;

FIGURE 5 is a perspective and partially broken away view of a device constructed in accordance with this invention, including a movable stand mounted on rollers in association with which is a hexagonal assembly of containers, described in my co-pending application Serial No. 354,610, filed March 25, 1964;

Figure 13:
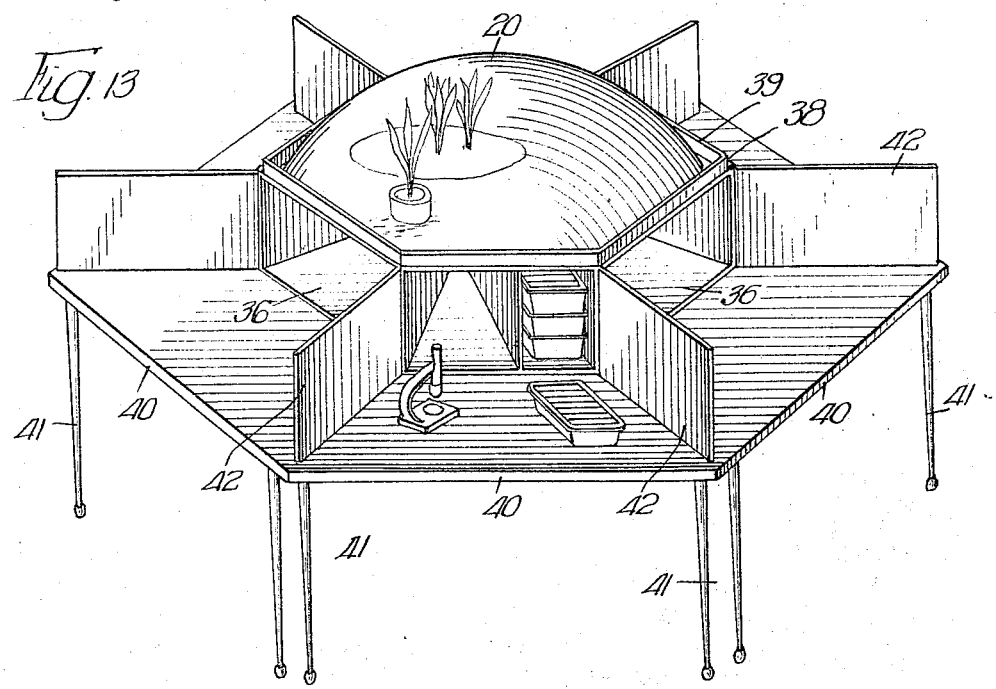
Figure 14:
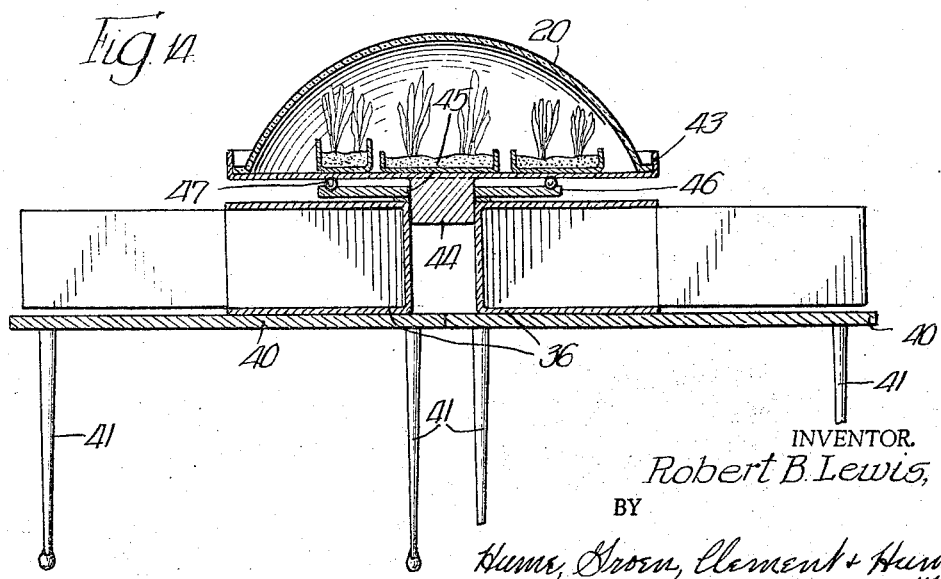

FIGURES 6 to 12 inclusive are diagrammatic views of various combinations and arrangements constructed in accordance with this invention and mounted on a movable stand such as that illustrated in FIGURE 5;

FIGURE 13 is a perspective view of a hexagonal supporting work table having associated therewith six containers disposed to form a hexagon centrally of the table in the manner described and claimed in my co-pending application Serial No. 354,610, filed March 25, 1964, and a central display within an environment enclosed by a display dome in accordance with this invention;

FIGURE 14 is a cross sectional view in elevation of an arrangement similar to that illustrated in FIGURE 13 with the provision of a rotary display.

Referring now to the drawings generally, it will be noted that the invention in an essential aspect includes a spherical, transparent member 20 provided at its edge with a laterally extending flange 21. The device may be made of Plexiglas, Lucite, or any other transparent material, including glass.

In some instances, the transparent member 20 may take the form of a complete hemisphere but, in other instances, it would be satisfactory to have a shape conforming to a segment of a sphere but less than a full hemisphere in arcuate extent. It is in this sense that the transparent member 20 is referred to herein as spherical.

The thickness of the material constituting the transparent member 20 is not critical providing only that it is thick enough to provide the strength to maintain it against accidental damage and breakage and, when serving as a receptacle, to support the contents thereof.

In the form of the invention illustrated in FIGURE 1, a tray 22 is provided of circular formation and having an upstanding flange 23 adapted to detachably accommodate the transparent member 20 in the manner shown. It will be noted that the tray 22 is not limited to a circular configuration but may be of any regular polygonal geometric planar configuration having three or more sides so that the annular lateral flange 21 of the transparent member 20 will abut against the upstanding flange 23 at at least three tangential points on flange 21 such that the transparent member 20 is confined against lateral movement on the tray 22. This same consideration applies to the other supporting means illustrated, such as the support member 27 of FIGURES 2, 3 and 4, the hexagonal support member 32 of FIGURE 5, the hexagonal tray 38 of FIGURE 13, and the rotary support tray 43 of FIGURE 14.

In FIGURE 1, a source of energy 24 is provided, such as a light or heat lamp, preferably disposed around the perimeter on the inside of the dome whereby either heat or light, or both, as may be desired, can be projected upwardly against the inner surface of the dome and reflected downwardly to disperse in the manner shown. In this illustration also, separate containers 25 are provided for various specimens of plant life or similar specimens. In the event access to the outside atmosphere is required, suitable ventilating apertures 26 may be provided in the transparent member 20, in the tray 22, or both, as shown.

In the form of the device illustrated in FIGURE 2, an annular support member 27 is provided. The support member 27 in turn is suitably supported and is provided with an inwardly projecting annular flange 28. A circular plate or disk 29 is supported by the annular flange 28 and restrained from lateral movement by the upper edge portion 30 of the support member 28. The circular plate 29 serves as the floor of the enclosure. The transparent member 20 is disposed upright atop the circular plate 28 in the manner of a dome. The transparent member 20 is also restrained from lateral movement by the upper edge portion 30 of the support member 28. In this case, a single container 25 accommodates sand or the like 31 to provide a suitable atmosphere for living specimens such as the snake depicted in FIGURE 2.

The form of the invention illustrate in FIGURE 3 also includes an annular support member 27 having, in turn, a suitable support (not shown) and provided with an inwardly projecting flange 28 by which annular member 27 is adapted to engage and hold the flange 21 of the transparent member 20 which, in this case, is inverted to serve as a receptacle. As illustrated, the receptacle will serve to accommodate a display of aquatic life, such as fish and aquatic vegetation.

FIGURE 4 illustrates two spherical members 20 vertically juxtaposed to provide an environment for an aggregation of aquatic, amphibious or terrestrial life. The lower spherical member 20 serves as a receptacle and has its flange 21 disposed in engagement with the annular member 27 and flange 28 in the same manner as in FIG- URE 3. Above the lower member 20 is a second spherical member 20 disposed in dome-like fashion with its flange 21 in engagement with the annular member 27 and the flange 21 of the lower member 20 so as to accommodate an atmosphere or environment essential or desirable with respect to the forms of life displayed.

In FIGURE 5, a form of the invention similar to that illustrated in FIGURE 4 is mounted on a mobile stand 31 having an upper hexagonal support member 32, as shown by the broken portion of FIGURE 5 (the support member 22), provided with an inwardly projecting flange 33 to accommodate a pair of the transparent spherical members 20 in substantailly the same manner as illustrated in FIGURE 4. The support member 32 is affixed to three legs 34, each provided with a castor or roller 35 to render the stand 31 readily movable on a floor or surface. Located below the display are a plurality of containers 36 which may be arranged to form a hexagon in the manner described in my co-pending application Serial No. 354,610, filed March 25, 1964.

Other mobile arrangements of the display domes and receptacles are diagrammatically illustrated in FIGURES 6 to 12 inclusive, all as representative of preferred arrangements for particular instances of display for storage and teaching.

In FIGURE 6, for example, a dome arrangement, such as shown in FIGURE 1 or FIGURE 2, is mounted on an upper supporting surface 37 below which are two tiers of hexagonally arranged containers 36 of the type referred to in my above-identified co-pending application.

FIGURE 7 is a diagrammatic illustration of the type of arrangement shown in FIGURE 5.

FIGURES 8, 9, 10 and 11 diagrammatically illustrate various mounting arrangements of receptacles and enclosing domes of the type shown in FIGURES 1 through 4.

Figure 11:
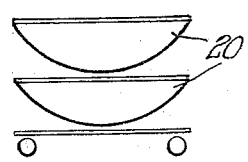
Figure 12:
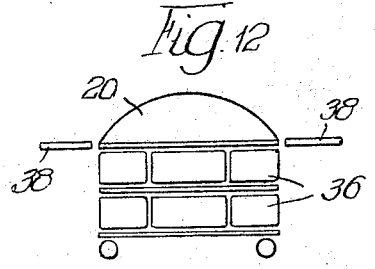

FIGURE 12 is a diagrammatic view similar to FIGURE 6, but further illustrating the provision of an extension or work surface 38 projecting laterally about the base of the display dome.

Referring now to FIGURE 13, the spherical transparent member 20 is detachably mounted as a display dome in a hexagonal tray 38 having an upstanding flange 39 to engage and hold the transparent member 20. The hexagonal tray 38 is mounted above and centrally of a hexagonal assembly of containers 36 of the type described and claimed in my above-identified co-pending application. The containers 36, in turn, are mounted on a hexagonal support surface of a construction to provide individual work areas in association with each of the containers. In this instance, the hexagonal support surface is a work table made up of a plurality of trapezoidal surfaces 40 mounted on suitable legs 41 and associated so as to form a hexagonal surface as illustrated. In each case, the individual container 36 may be of any suitable construction and adapted to contain any scientific instruments or devices which may be required for the contemplated work. Also, the closing door 42 of each container 36, when in open position, provides a suitable partition located between the adjacent work areas so as to provide an element of privacy for each student or worker.

As illustrated in FIGURE 14, the transparent member 20, in an arrangement similar to that of FIGURE 13, may be detachably mounted on a rotary support tray 43 which has a central cylindrical shaft 44 extending through a central circular aperture 45 in a bearing support 46. The bearing support 45 is adapted to accommodate a plurality of ball bearings 47 on which the support tray 43 can be easily rotated. It will be apparent that other forms of bearings may be utilized as desired. The bearing support 46 is mounted on the containers 36 collectively arranged as a hexagon with a central opening in the manner shown.

It will be noted that the spherical transparent member 20 of this invention, due to its shape, possesses unusual strength which enables it to be formed with a minimum of material. At the same time it allows the worker to observe through the shortest lines of inspection all areas of the exhibit or display maintained within the environment of the display device. It also protects the specimen from handling or unwanted contamination.

Although several preferred embodiments of the invention have been described, it is to be understood that this is merely by way of example and in no manner to be construed as a limitation. It is contemplated that certain modifications may be made within the scope of the claims without departing from the spirit of invention.

What is claimed is:

1. A display device for living specimens, said display device comprising at least one transparent member formed as a segment of a sphere no greater than a hemisphere in arcuate extent and terminating in a lateral, outwardly-extending flange and a support member for said transparent member, said support member having a horizontally-disposed portion supporting said lateral, outwardly-extending flange of said transparent member, said support member further having a vertically-disposed portion adapted to abut against said lateral, outwardly-extending flange of said transparent member so as to restrain said transparent member against lateral movement relative to said support member, said laterally extending flange of said transparent member being supported by said horizontally-disposed portion of said support member by gravitational force without other securement against relative movement of said transparent member in a vertical direction, whereby said transparent member may at all times readily be removed from said support member by lifting said transparent member vertically.

2. A display device according to claim 1 wherein said transparent member is disposed in upright position as an enclosing dome.

3. A display device according to claim 1 wherein said transparent member is disposed in an inverted position as a receptacle.

4. A display device according to claim 1 wherein said support member in the horizontal plane is of circular configuration.

5. A display device according to claim 1 wherein said support member in the horizontal plane is of regular polygonal configuration having three or more sides.

6. A display device for living specimens, said display device comprising first and second transparent members disposed in vertical opposing relationship, each of said first and second transparent members being formed as a segment of a sphere no greater than a hemisphere in arcuate extent and terminating in a lateral, outwardly-extending flange and a support member for said pair of transparent members, said support member having a lateral, horizontally-disposed inwardly-extending flange defining a central opening in said support member and supporting the lateral, outwardly-extending flanges of said first and second transparent members, said support member further having a vertically-disposed portion abutting against said lateral, outwardly-extending flanges of said pair of transparent members so as to restrain said pair of transparent members against lateral movement relative to said support member, said first transparent member being disposed in an inverted position as a receptacle having a spherical portion extending downwardly through said central opening in said support member and having its said lateral, outwardly-extending flange resting directly on said inwardly-extending flange of said support member by gravitational force without other securement against relative movement in a vertical direction, said second transparent member being disposed in an upright position as an enclosing dome and having its outwardly extending flange resting directly on said outwardly-extending flange of said first transparent member by gravitational force without other securement against relative movement in a vertical direction.

7. A display device comprising a transparent member formed as a segment of a sphere no greater than a hemisphere in arcuate extent and terminating in a lateral, outwardly-extending flange, a plate complementary in extent with said lateral, outwardly-extending flange of said transparent member, and a support member having a horizontally-disposed portion adapted to engage and support said plate, said transparent member being disposed upright atop said plate as an enclosing dome, said support member further having a vertically-disposed portion adapted to abut against the rim of said pate and against said lateral flange of said transparent member so as to restrain both said plate and said transparent member against lateral movement relative to said support member, said plate resting on said horizontally-disposed portion of said support member by gravitational force without other securement against relative movement in a vertical direction, said outwardly-extending flange of said transparent member being disposed in an upright position as an enclosing dome and having its outwardly-extending flange resting directly on said plate by gravitational force without other securement against relative movement in a vertical direction.

References Cited by the Examiner

UNITED STATES PATENTS

| | | | |
|---|---|---|---|
| 262,232 | 8/1882 | Kowalevsky | 220—4 |
| 490,902 | 1/1893 | Galbreath | 220—4 |
| 660,782 | 10/1900 | Strumpell. | |
| 684,738 | 10/1901 | Adams. | |
| 1,029,926 | 6/1912 | Hasburg | 206—1.9 |
| 1,921,015 | 8/1933 | Young | 206—46 |

THERON E. CONDON, *Primary Examiner.*

W. T. DIXSON, *Assistant Examiner.*